(12) United States Patent
Dome et al.

(10) Patent No.: US 6,543,618 B1
(45) Date of Patent: Apr. 8, 2003

(54) PROCESS TO RECOVER RAW RUBBER COMPOUND FROM SEMI-FINISHED, REINFORCED, TECHNICAL RUBBER PRODUCTS, ESPECIALLY HOSES, BEFORE CROSS-LINKING, AND EQUIPMENT THEREFOR

(75) Inventors: Lajos Dome, Alsokikotosor (HU); Andras Kezsmarki, Munkacsi (HU)

(73) Assignee: Technoplast 2000 Kkt, Szeged (HU)

( * ) Notice: Subject to any disclaimer, the term of this patent is extended or adjusted under 35 U.S.C. 154(b) by 0 days.

(21) Appl. No.: 09/719,850

(22) PCT Filed: Jun. 15, 1999

(86) PCT No.: PCT/HU99/00046
§ 371 (c)(1),
(2), (4) Date: Feb. 22, 2001

(87) PCT Pub. No.: WO99/65658
PCT Pub. Date: Dec. 23, 1999

(30) Foreign Application Priority Data

Jun. 16, 1998 (HU) .............................................. 9801352

(51) Int. Cl.$^7$ .............................................. B29B 17/02
(52) U.S. Cl. ........................ 209/11; 425/200; 425/202
(58) Field of Search ................................ 209/11, 45, 46, 209/49; 264/37.1; 425/200, 201, 202

(56) References Cited

U.S. PATENT DOCUMENTS

| | | | | |
|---|---|---|---|---|
| 2,291,862 A | * | 8/1942 | Bailey | 134/1 |
| 3,744,779 A | * | 7/1973 | Perry | 209/11 |
| 3,993,291 A | * | 11/1976 | Brinkman | 366/83 |
| 4,342,647 A | | 8/1982 | McMillan et al. | |
| 5,059,111 A | * | 10/1991 | Mossinger et al. | 425/294 |
| 5,250,131 A | * | 10/1993 | Gitelman | 156/95 |
| 5,369,215 A | * | 11/1994 | Platz | 585/241 |
| 5,492,657 A | * | 2/1996 | Danschikov et al. | 264/37 |
| 6,206,199 B1 | * | 3/2001 | Kurtz et al. | 209/3 |

FOREIGN PATENT DOCUMENTS

| | | | | |
|---|---|---|---|---|
| DE | 4032598 A1 | * | 4/1992 | ............. B29B/9/04 |
| GB | 533 769 | * | 2/1941 | |
| JP | 59 192544 A | * | 10/1984 | |
| JP | 63 112138 A | * | 10/1986 | |

OTHER PUBLICATIONS

Derwent Abstract #1978–20120A; Assignee: Hiroshima Kasei ltd.; Abstracted Pub No.: JP 50149768A; Dec. 1, 1975.*

Derwent Abstract #1985–293887; Assignee: Kishyha Netsyren KK; Abstracted Pub. No.: JP 60203411A; Mar. 28, 1984.*

Derwent Abstract #1992–133224; Goth et al.; Abstracted Pub. No.: DE 4032598; Apr. 16, 1992.*

Derwent Abstract #1978–20120A; Assignee: Hiroshima Kasei ltd.; Abstracted Pub No.: JP50149768A; Dec. 1, 1975.*

* cited by examiner

Primary Examiner—Donald P. Walsh
Assistant Examiner—Joseph Rodriguez
(74) Attorney, Agent, or Firm—Duane Morris LLP

(57) ABSTRACT

A process for recovering raw rubber compounds from unvulcanized reinforced, semi-finished technical rubber products includes pressing the rubber products between metal surfaces heated to a temperature from 50 to 300° C., or preheating the rubber products to a temperature from 50 to 300° C.; and then pressing the rubber products between metal surfaces. Also, equipment for carrying the above process including a preheated or forewarmed space, and rolls in close proximity to the preheated space, the rolls rotating preferably at the same speed, but in opposite directions. The equipment has means for the adjustment of the gap between the rolls, drive means for the rolls, and if required, may be equipped with known aligning, guiding and forwarding mechanisms.

14 Claims, 2 Drawing Sheets

PROCESS TO RECOVER RAW RUBBER COMPOUND FROM SEMI-FINISHED, REINFORCED, TECHNICAL RUBBER PRODUCTS, ESPECIALLY HOSES, BEFORE CROSS-LINKING, AND EQUIPMENT THEREFOR

FIELD OF THE INVENTION

The present invention relates to the recovery of raw rubber compounds used for recycling and/or reprocessing, from the extruded faulty products or waste (scrap), which are produced during the manufacture of reinforced rubber hoses or tubes for the automotive and other industries, and more particularly to a process for recovering raw rubber compound from semi-finished, reinforcement containing technical rubber products, especially hoses (tubes), before crosslinking (vulcanizing) the same. The invention also relates to equipment for implementing this process.

BACKGROUND OF THE INVENTION

Recently, unvulcanized, raw rubber compounds have been recycled from scrap, produced during extrusion or calandering, only if the scrap does not contain any reinforcement. Scrap raw rubber containing reinforcement is not suitable for further processing (by extrusion or calandering, also known as procuring), because the rubber compound becomes elasticized and bonds to the reinforcement due to heat transfer during the procuring process.

Currently, there are no known methods for recovering unvulcanized rubber scrap formed during the manufacturing process, although there are several known methods for recovering rubber from vulcanised end-products. Manufacturers usually recycle the unvulcanized rubber after milling it in ripped two roll mills or cutting it in shredders into particles having an average particle size of smaller than 10 mm.

The resulting material can be used for the production of technical rubber products, rubber sheets and solid rubber tires, as secondary raw material having a high (42–45%) rubber content (see Gumiipari Kezikonyv, $2^{nd}$ Volume, TAURUS-OMIKK, Budapest, 1989).

It should be understood, that the above methods can not be used for producing reinforced, straight or specially shaped rubber hoses (used in the automotive industry for water and oil hydraulic and gas hoses), since the recovered material can not be admixed with the new raw rubber compound used in manufacturing hoses. The use of such textile containing raw material is not acceptable, because the working conditions of the product the stresses on the product, further the manufacturing requirements do not allow it.

Therefore, recycling of reinforced rubber from the scrap produced during or before procuring has not been possible.

The above technical problem results in unnecessary raw material, transport and waste disposal costs for manufacturers, and it also creates environmental problems, as produced scrap is not practically biodegradable, and thus, pollutes the environment.

Furthermore, during manufacturing of such rubber products, the estimated amount of reinforcement containing scrap or waste produced during the extrusion (calandering) step, is about 2–15% of the weight of the end-product. Therefore, there is a great need for a process which recovers recyclable raw rubber compound from unvulcanized, reinforced rubber scrap.

A process has been disclosed in DE 3137502 for recycling of vulcanized and unvulcanized rubber scrap. According to this process, the compounds containing such materials are exposed to heat in boiling hydrocarbon solvents, under pressure and under inert atmosphere. The product obtained by this process can be used as plasticizing agent or demulcent for rubber compounds. However, this process is not suitable for recovering recyclable raw rubber compound from unvulcanized, reinforced rubber scrap.

Accordingly, the aim of the present invention is to provide a method for recovering raw rubber compound from unvulcanized, reinforced rubber compounds.

SUMMARY OF THE INVENTION

The present invention involves a process for recovering raw rubber compounds from unvulcanized reinforced, semi-finished technical rubber products. In one embodiment of the invention the process comprises pressing the rubber products between metal surfaces heated to a temperature from 50 to 300° C., thereby causing elasticized rubber to flow out; and cooling the elasticized rubber to ambient temperature.

In another embodiment of the invention the process comprises preheating the rubber products to a temperature from 50 to 300° C.; pressing the rubber products between metal surfaces, thereby causing elasticized rubber to flow out; and cooling the elasticized rubber to ambient temperature.

The present invention also involves equipment for carrying the above process. The equipment comprises a preheated or forewarmed space, and rolls in close proximity to the preheated space, the rolls rotating preferably at the same speed, but in opposite directions. The equipment has means for the adjustment of the gap between the rolls, drive means for the rolls, and if required, may be equipped with known aligning, guiding and forwarding means.

DETAILED DESCRIPTION OF THE INVENTION

Figure 1A:
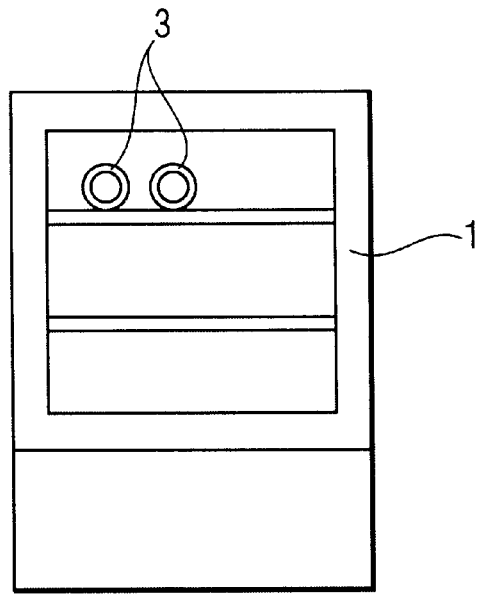
FIGS. 1A and 1B show a preheating unit.

In order to better understand the invention, the same has been disclosed in connection with (rubber hoses), however it should be clear that a person skilled in the art, will be able to apply the present invention for rubber belts or other technical rubber products as well, on basis of the teaching of the present specification.

In the present invention, it has been surprisingly found that the rubber compound becomes elasticized, and flows out from the space between the reinforcements, when the unvulcanized, reinforced rubber semi-product is placed between metal surfaces, which are heated to a predetermined temperature; or when the rubber semi-product is preheated to a certain temperature and then placed between metal surfaces, by which a certain pressure is applied. The rubber compound can then be separated from the reinforcements, even manually. The recovered rubber is cooled to room temperature and recycled.

It is known in the art, that rubber hoses are manufactured in the following technological steps: a) extrusion: b)vulcanization; and c) finishing. During the extrusion step (which known as calandering in case of rubber belts), a non-reinforced rubber hose (seal) is produced by an extruder. The hose possesses the required properties, and forms an inner liner. Reinforcement is laid on the inner liner with a braider or spiralling machine, and a cover layer is put on the reinforced inner liner with a cross headed extruder. The hose is then cut to a required length by a cutting machine.

During the vulcanizing step, the semi-finished hoses cut to the required length are placed on a mandrel having the required shape, and then the hoses are vulcanized under selected operational conditions, such as optimal temperature, pressure, vulcanising time, humidity, etc.

During the finishing step, the hoses are pulled off from the mandrel after vulcanization, and then inspected, repaired, labelled and packed.

The process according to the present invention enables the manufacturer to recover and to make the rubber compound recyclable from the reinforced rubber scrap produced during the adjustment or routine operation of extrusion or calandering.

The essence of the process of the present invention is that the reinforced unvulcanized semi-finished rubber products, preferably rubber hoses, are pressed between metal surfaces heated up to a temperature of 50–300° C.; or are pressed by other means; or the rubber products are preheated to the above mentioned temperature and placed between metal surfaces and pressed. The elasticized rubber compound flowing out is recovered and cooled to ambient temperature.

According to an embodiment of the process of the present invention, the reinforced unvulcanized semi-finished rubber hose is placed between pressing plates (in other words between metal surfaces), which are heated to the above mentioned temperature, and are pressed with 5–50 ton force.

According to a further embodiment of the process of the present invention, the reinforced, unvulcanized, semi-finished rubber hoses are cut into 20–80 cm long pieces, and preheated in a preheating unit for 0.5–10 minutes. The cut, and preheated pieces are led between a pair of rotating rolls, which are preferably rotating at the same speed, but in opposite directions.

A further embodiment of the process according to the present invention is to preheat the reinforced, unvulcanized, semi-finished rubber hoses to a temperature of 50–300° C., preferably between 50–160° C. The heated, moving pressing plate may be moved by a mechanical or a hydraulic system.

In the case of using a preheating unit, the reinforced, unvulcanized, semi-finished rubber hoses cut to a required length, are preheated to 40–300° C., preferably to a maximum of 160° C., for 0.5–10 minutes. The preheated, reinforced, unvulcanized, semi-finished rubber hoses are led between a pair of rotating rolls, which are rotating preferably at the same speed, but in opposite directions. The gap between the rolls can be adjusted between 0.5–50 mm with a screw shaft, depending on the diameter of the rubber hoses. The rotating rolls are driven by a heavy-duty electric motor with a cogwheel transmission. The free length of the rolls is a minimum of 250 mm.

In the case of using a preheating unit, the preheating unit's length is selected between 300–1000 mm and its temperature is selected from the above mentioned range. The reinforced unvulcanized, semi-finished rubber hoses go through the preheating unit, and then are led between the rolls rotating in the opposite directions. The rolls are placed directly after the preheating unit. The gap between the rolls can be adjusted in the same way and in the same range as described above, and also the free length of the rolls is the same as given above.

The temperature and time of preheating is selected taking into account the vulcanization parameters of the material to be processed.

The process is carried out similarly in case of using conical rolls, to enhance the efficacy of the process.

The following example is to illustrate the process of the invention, for better understanding. It should be noted however, that the process of the invention is not restricted to this example.

EXAMPLE

An unvulcanized semi-finished rubber hose, containing polyamide reinforcements and having 25 mm outer diameter, 2 mm outer wall thickness and 2 mm inner wall thickness, is pressed between pressing plates preheated to 160° C. for 3 seconds with 40 ton force. After cooling to ambient temperature, the rubber compound is obtained. About 70–80% of the rubber compound is recovered in this way.

The equipment according to the invention to carry out the process of the invention is characterised in that it contains a preheated or forewarmed space, and rolls in close proximity to the preheated space (e.g. before or beside it), the rolls rotating preferable at the same speed, but in opposite directions. The device has means for the adjustment of the gap between the rolls, drive means for the rolls, and if required, may be equipped with known aligning, guiding and forwarding means.

Figure 1B:
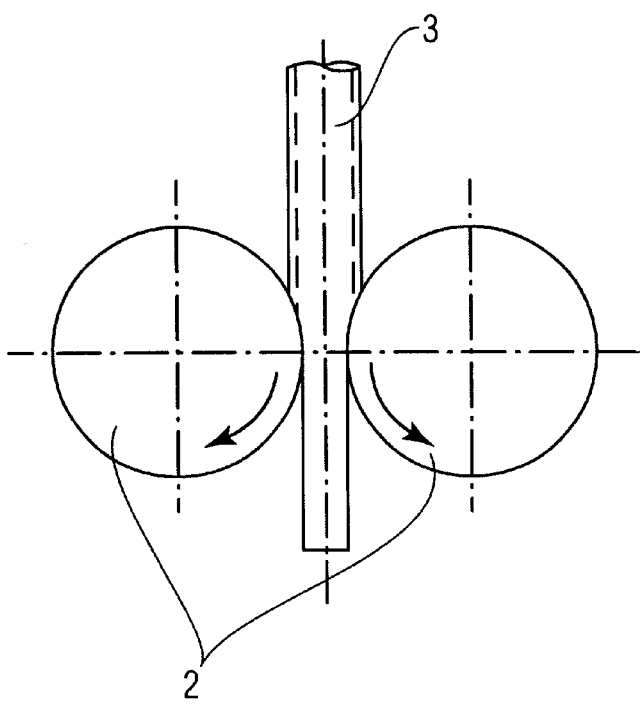
Figure 2B:
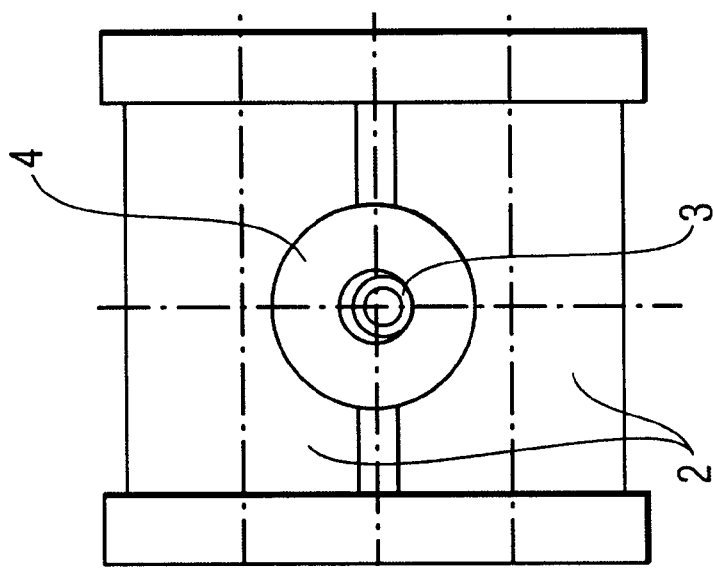
FIGS 2A and 2B show a forewarming unit.
Figure 2A:
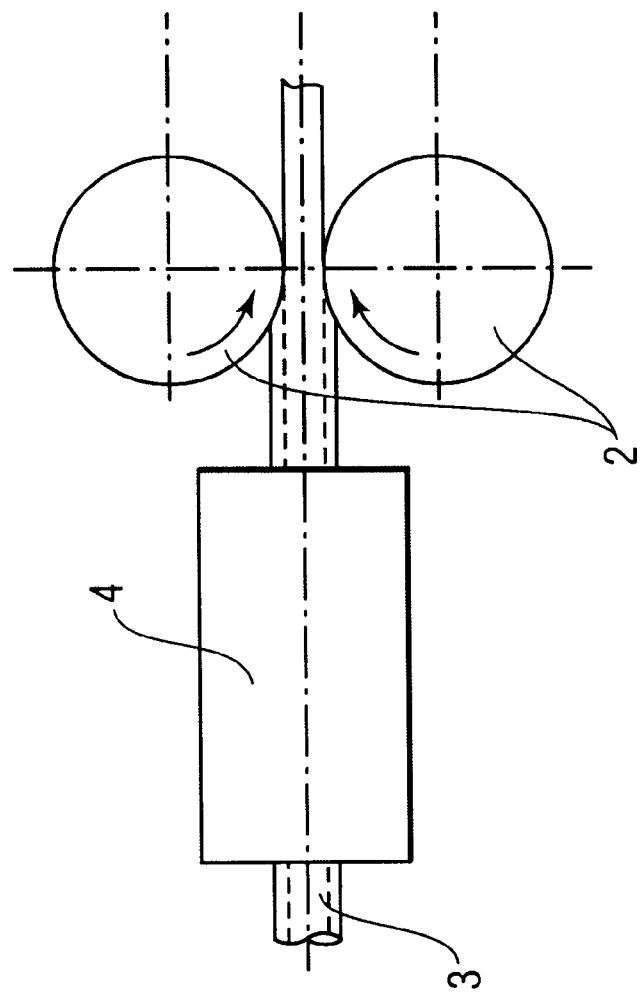

FIGS. 1A and 1B show a preheating unit 1, and a reinforced, unvulcanized, semi-finished rubber hose 3. FIGS. 2A and 2B show a forewarming unit 4, and other elements, identical to those shown in FIGS. 1A and 1B. In the embodiment shown in FIGS. 1A and 1B, the preheating unit 1 is intended for batch processing the reinforced, unvulcanized, semi-finished rubber hose 3, since the product is not necessarily fed continuously between rolls 2, which rotate at the same speed, but in opposite directions. On the other hand, the forewarming unit 4 shown in the embodiment of FIGS. 2A and 2B continuously feeds the reinforced unvulcanized, semifinished rubber hose 3 between the rolls 2 rotating at the same speed, but in opposite directions.

What is claimed is:

1. A process for recovering raw rubber compounds from unvulcanized reinforced, semi-finished technical rubber products, comprising:

providing unvulcanized reinforced, semi-finished technical rubber products;

pressing the rubber products between metal surfaces heated to a temperature from 50 to 300° C., thereby causing elasticized rubber to flow out;

cooling the elasticized rubber to ambient temperature.

2. The process of claim 1, wherein pressing is performed by a pair of rolls rotating in opposite directions.

3. The process of claim 2, wherein the rolls rotate at the same speed.

4. The process of claim 2, wherein each of the rolls has a conical shape.

5. A process for recovering raw rubber compounds from unvulcanized reinforced, semi-finished technical rubber products, comprising:

providing unvulcanized reinforced, semi-finished technical rubber products;

cutting the rubber products into 20–80 cm long pieces;

preheating the rubber products in a preheating unit for 0.5 to 10 minutes to a temperature of 40 to 300° C.

6. The process of claim 5, wherein the rolls rotate at the same speed.

7. The process of claim 5, wherein each of the rolls has a conical shape.

8. A process for recovering raw rubber compounds from unvulcanized reinforced, semi-finished technical rubber products, comprising:

providing unvulcanized reinforced, semi-finished technical rubber products;

cutting the rubber products into 20–80 cm long pieces;

preheating the rubber products in a preheating unit for 0.5 to 10 minutes to a temperature of 40 to 160° C.;

pressing the rubber products between metal surfaces defined by a pair of rolls rotating in opposite directions, thereby causing elasticized rubber to flow out; and cooling the elasticized rubber to ambient temperature.

9. The process of claim 8, wherein the rolls rotate at the same speed.

10. The process of claim 8, wherein each of the rolls has a conical shape.

11. A process for recovering raw rubber compounds from unvulcanized reinforced, semi-finished technical rubber products, comprising:

providing unvulcanized reinforced, semi-finished technical rubber products;

preheating the rubber products in a preheating unit to a temperature from 50 to 300C.;

pressing the rubber products between metal surfaces of a pair of rolls rotating in opposite directions at the same speed, thereby causing elasticized rubber to flow out; and cooling the elasticized rubber to ambient temperature.

12. A process for recovering raw rubber compounds from unvulcanized reinforced, semi-finished technical rubber products, comprising:

providing unvulcanized reinforced, semi-finished technical rubber products;

preheating the rubber products in a preheating unit for 0.5 to 10 minutes to a temperature of 50 to 160° C.;

pressing the rubber products between metal surfaces defined by a pair of rolls rotating in opposite directions, thereby causing elasticized rubber to flow out; and cooling the elasticized rubber to ambient temperature.

13. The process of claim 12, wherein the rolls rotate at the same speed.

14. The process of claim 12, wherein each of the rolls has a conical shape.

* * * * *

UNITED STATES PATENT AND TRADEMARK OFFICE
CERTIFICATE OF CORRECTION

PATENT NO.   : 6,543,618 B1
DATED        : April 8, 2003
INVENTOR(S)  : Dome et al.

It is certified that error appears in the above-identified patent and that said Letters Patent is hereby corrected as shown below:

<u>Column 4,</u>
Line 67, Claim 5 after the last paragraph "to 10 minutes to a temperature of 40 to 300 C.", please add the following missing two (2) paragraphs as follows:

-- pressing the rubber products between metal surfaces defined by a pair of rolls rotating in opposite directions, thereby causing elasticized rubber to flow out; and cooling the elasticized rubber to ambient temperature. --

Signed and Sealed this

Twelfth Day of August, 2003

JAMES E. ROGAN
*Director of the United States Patent and Trademark Office*